(12) United States Patent
Eilts et al.

(10) Patent No.: US 7,324,606 B2
(45) Date of Patent: Jan. 29, 2008

(54) COMPUTATIONALLY EFFICIENT SYSTEM AND METHOD FOR CHANNEL ESTIMATION

(76) Inventors: Henry Stephen Eilts, 7504 Mullins Dr., Plano, TX (US) 75025-2868; Srinath Hosur, 8800 Canyonlands Dr., Plano, TX (US) 75025; David Patrick Magee, 2401 Bowie Dr., Plano, TX (US) 75025; Dennis Rauschmayer, 7304 Swanson Dr., Plano, TX (US) 75025

( * ) Notice: Subject to any disclaimer, the term of this patent is extended or adjusted under 35 U.S.C. 154(b) by 1124 days.

(21) Appl. No.: 10/001,986

(22) Filed: Oct. 31, 2001

(65) Prior Publication Data

US 2003/0081695 A1    May 1, 2003

(51) Int. Cl.
*H03K 9/00* (2006.01)
*H04L 27/00* (2006.01)

(52) U.S. Cl. .................. 375/316; 375/147; 375/144; 375/136; 455/334

(58) Field of Classification Search ............... 375/316, 375/259, 344, 340, 260, 147, 136, 144; 455/63, 455/334
See application file for complete search history.

(56) References Cited

U.S. PATENT DOCUMENTS

| | | | |
|---|---|---|---|
| 5,127,051 A | 6/1992 | Chan et al. | 380/49 |
| 6,005,840 A | 12/1999 | Awater et al. | 370/206 |
| 6,091,932 A | 7/2000 | Langlais | 455/5.1 |
| 6,185,257 B1 | 2/2001 | Moulsley | 375/260 |
| 6,192,026 B1 | 2/2001 | Pollack et al. | 370/203 |
| 6,198,782 B1 | 3/2001 | De Courville et al. | 375/341 |
| 6,226,337 B1 | 5/2001 | Klank et al. | 375/367 |
| 6,240,146 B1 * | 5/2001 | Stott et al. | 375/344 |
| 6,263,029 B1 | 7/2001 | Alard et al. | 375/340 |
| 6,563,885 B1 * | 5/2003 | Magee et al. | 375/316 |
| 6,765,969 B1 * | 7/2004 | Vook et al. | 375/259 |
| 2002/0111142 A1 * | 8/2002 | Klimovitch | 455/63 |
| 2003/0086508 A1 * | 5/2003 | Magee | 375/340 |

\* cited by examiner

*Primary Examiner*—Dac Ha
*Assistant Examiner*—Ted M. Wang
(74) *Attorney, Agent, or Firm*—Steven A. Shaw; W. James Brady; Frederick J. Telecky, Jr.

(57) ABSTRACT

A system and method is provided for determining a channel estimate utilizing partial channel estimates to provide an aggregated channel estimate. A partial channel estimate is determined upon receipt of a data burst, such that a different subset of the channel estimate is updated every data burst. As a result, Fast Fourier Transform computations can be reduced by determining a portion of the channel estimate each data burst as opposed to determining a full channel estimate every data burst.

31 Claims, 7 Drawing Sheets

COMPUTATIONALLY EFFICIENT SYSTEM AND METHOD FOR CHANNEL ESTIMATION

TECHNICAL FIELD

The present invention generally relates to communication systems and in particular to a system and method for performing a computationally efficient channel estimation procedure.

BACKGROUND OF INVENTION

Various types of distortion and noise are introduced into data signals that are transmitted over a communication path. The distortion and noise are due to interference with other signals within the same frequency range and also due to multipath dispersions. Multipath dispersions occur when signals propagate along different or reflected paths through a transmission medium to a receiving destination. In a wireless system, data signals are transmitted through space as modulated radio transmission waves or electromagnetic waves. Radio transmissions or data signals that travel through the air can reflect off trees, vehicles, houses, larger buildings, and terrain features such as mountains and hills. Generally, a signal or beam travels along a main or direct line-of-sight transmission path, while reflected signals travel along various reflected paths. Each reflected path has an associated delay and the overall effects of all such signals are a combination of the main signal and a plurality of reflected or delayed signals. Therefore, the signal received is usually not the same as the original signal transmitted, and when the signal is demodulated and decoded, errors in the original transmitted data often result.

The effect of the multipath scattering is to alter or distort the received signal spectrum when compared to the spectrum as transmitted. In general, the effects are different at various frequencies across the signaling band. At some frequencies, the multipath signals add constructively to result in an increased signal amplitude, while at other frequencies the multipath signals add destructively (out of phase) to cancel or partially cancel the signal, resulting in reduced signal amplitude.

A wireless communication system is designed to compensate for the deleterious effects of multipath dispersion. Many wireless systems and some wired systems employ a channel estimation procedure to determine the effects the transmission environment has on the transmitted data signals. The channel estimation procedure can utilize training signals of known magnitude and phase to compensate for signal changes due to the transmission environment. The training signals can be transmitted prior to transmission of the data signals or interspersed in the data signals. The training signals can be analyzed to determine the effects of the environment on the transmitted signal and this information utilized to adjust the data signals appropriately.

One mechanism for analyzing training signals is to perform an Inverse Fast Fourier Transform (IFFT) on the training signals to determine the impulse response of the communication channel. If there is little or no distortion in the channel, then one sample of the channel impulse response will have a significant value, while the remaining samples will have little or no value. If there is distortion in the channel, then each sample of the impulse response will have some significant value. The impulse response is then used to determine the magnitude change and the phase shift that the environment has caused to the data signals. An adjustment can then be made on the data signals, so that a reduction in transmission errors can be facilitated.

However, the employment of FFTs and IFFTs on signals is computationally expensive. Therefore, any reduction in system computations is desirable.

SUMMARY OF INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and method for performing a channel estimate of a transmission channel at frequencies used for data transmission. The frequencies at which the channel estimates are obtained are divided into K subsets. Channel estimates for a different subset of frequencies are determined for a given data signal or burst occurrence, such that a fractional portion of the channel estimate is determined for the given data burst. The partial channel estimate can then be aggregated with previously determined partial channel estimates to provide a full channel estimate. A different frequency subset of the channel estimate is updated every data burst. Every time a new data signal or burst is received, the channel estimate is updated for $1/K^{th}$ of the frequencies in the burst. A full channel estimate is completed and updated every K data signals or bursts. The full channel estimate can then be utilized for the decoding of the data signals.

In one aspect of the invention, the transmission channel is a wireless path. The data signal can conform to a multicarrier modulation such that frequencies or tones are easily made available by employing a N-point FFT. The training tones can be extracted from the data signal. The training tones are demodulated and adjusted to correct for any differences in phase and magnitude. An Inverse Fast Fourier Transform (IFFT) is then performed on the tones to obtain time samples of the channel impulse response. The spectrum of the channel impulse response is frequency shifted based on a count value, zero padded and then provided to a FFT to provide a partial channel estimate. The count value is determined by a burst counter that increments modulo K every data burst, where K is the number of partial channel estimates or channel estimate subsets forming a full channel estimate. The partial channel estimate is combined with one or more other partial estimates to form a complete or full channel estimate. A full channel estimate is provided in K bursts. The channel estimation procedure can be software and/or hardware and reside on a receiver in many wireless applications (e.g., a modem).

The following description and the annexed drawings set forth certain illustrative aspects of the invention. These aspects are indicative, however, of but a few of the ways in which the principles of the invention may be employed. Other advantages and novel features of the invention will become apparent from the following detailed description of the invention when considered in conjunction with the drawings.

DETAILED DESCRIPTION OF THE INVENTION

The present invention will be described with reference to a system and method for providing a channel estimate of a channel (e.g., wireless) utilizing a fractional portion of a channel estimate or partial channel estimates to provide an aggregated channel estimate. A fractional portion or a partial channel estimate is determined upon receipt of a data burst, such that a different subset of the channel estimate is updated every data burst. As a result, FFT computations can be reduced by determining a portion of the channel estimate every data burst as opposed to determining a full channel estimate every data burst. Therefore, signal processing devices of reduced complexity can be utilized in the decoding process of transmission signals.

The present invention determines a channel impulse response using a data signal or burst. Training signals or tones are extracted from a data signal or burst and the channel impulse response determined utilizing the training signals or tones. A partial channel estimate is then determined by performing a FFT on the channel impulse response. The spectrum of the channel impulse response obtained at each burst is frequency shifted based on a count value which increments modulo K at each data burst, such that a partial channel estimate is obtained for a different subset of frequencies of each data signal or burst. The partial channel estimate is composed of channel estimate values for each frequency in the subset.

The results of the partial channel estimate are combined with at least one previously determined partial channel estimate (obtained for a different frequency subset or subsets) to provide an aggregated (e.g., full) channel estimate. The aggregated channel estimate is utilized to adjust the phase and magnitude of the data signals. In one aspect of the invention, every time a new data signal or burst is received $1/K^{th}$ of the aggregated channel estimate is updated, such that the channel estimate is completely updated in K data bursts.

Figure 1:
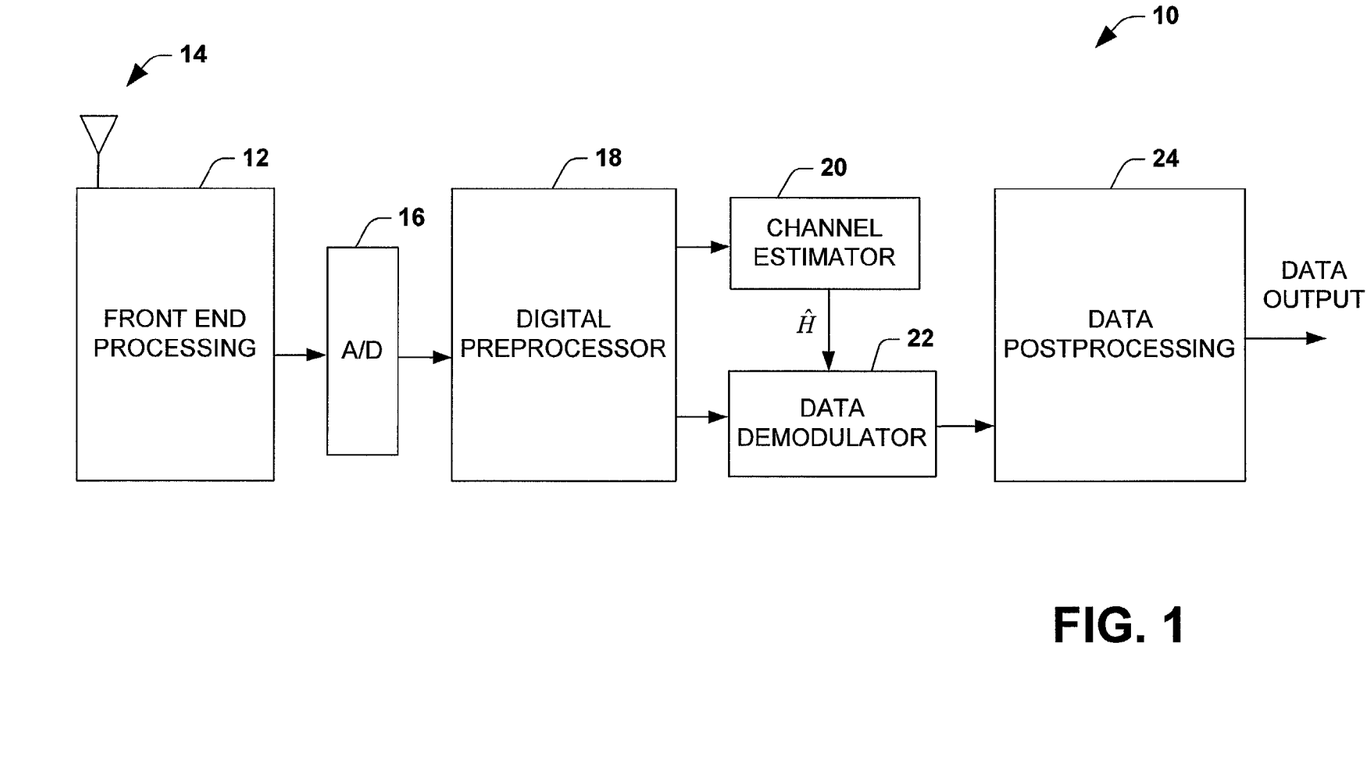
FIG. 1 illustrates a functional block diagram of a wireless receiver employing a channel estimator in accordance with one aspect of the present invention.

FIG. 1 illustrates a functional block diagram of a wireless receiver system 10 employing a channel estimator 20 in accordance with one aspect of the present invention. A data signal or burst is received by an antenna 14, which captures the data signal and transmits the data signal to a front end processing component 12. A data signal or burst is a transmission signal carrying data. The data signal or burst can also include other information such as training and calibration information. The front end processing component 12 amplifies the data signal, converts the data signal to an intermediate frequency (IF) and filters the data signal to eliminate signals that are outside of the desired frequency band. It is to be appreciated that many variations in receiver front end processing exist. For example, some receiver front end processing includes utilizing multiple IF frequencies and successive frequency conversions. Additionally, some receivers provide direct radio frequency (RF) sampling without IF stages. The front end processing component 12 feeds one or more analog-to-digital (A/D) converters 16 that sample the data signal and provide a digitized signal output. The front end processing component 12 can provide automatic gain control (AGC), as is conventional, to maintain the signal strength relative to the one or more A/D converters 16.

The digitized signal output of the one or more A/D converters 16 is then provided to a digital preprocessor 18. The digital preprocessor 18 provides additional filtering of the digitized signals and decimates the samples of the digitized signal. The digital preprocessor 18 then performs a FFT on the digitized signal. The FFT on the digitized signal converts the signal from the time domain to the frequency domain so that the frequencies or tones carrying the data can be provided. The exact implementation of the digital preprocessor 18 can vary depending on the particular receiver architecture being employed to provide the frequencies or tones carrying the data. The frequencies and tones can then be demodulated and/or decoded.

Figure 2:
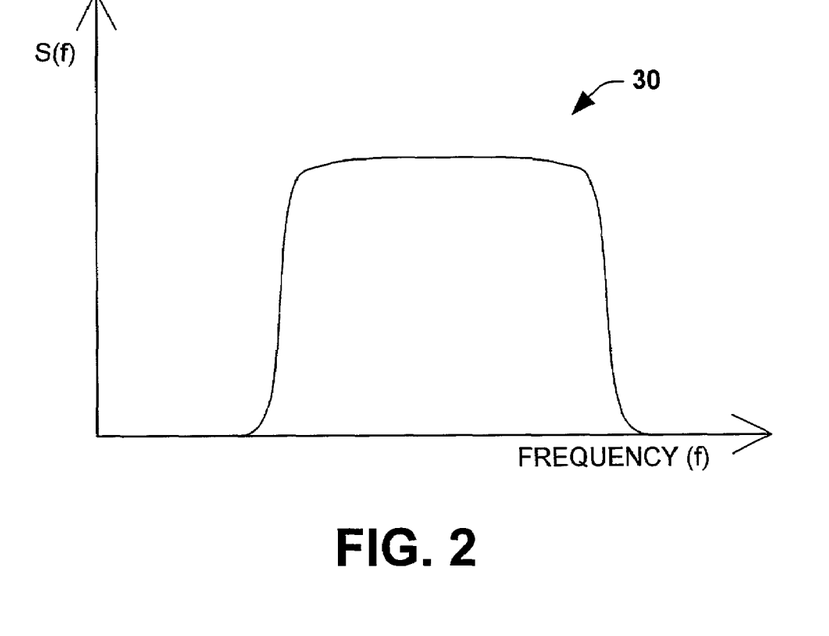
FIG. 2 illustrates a graph of power density spectrum S(f) versus frequency (f) of a transmission signal being transmitted over a channel.
Figure 3:
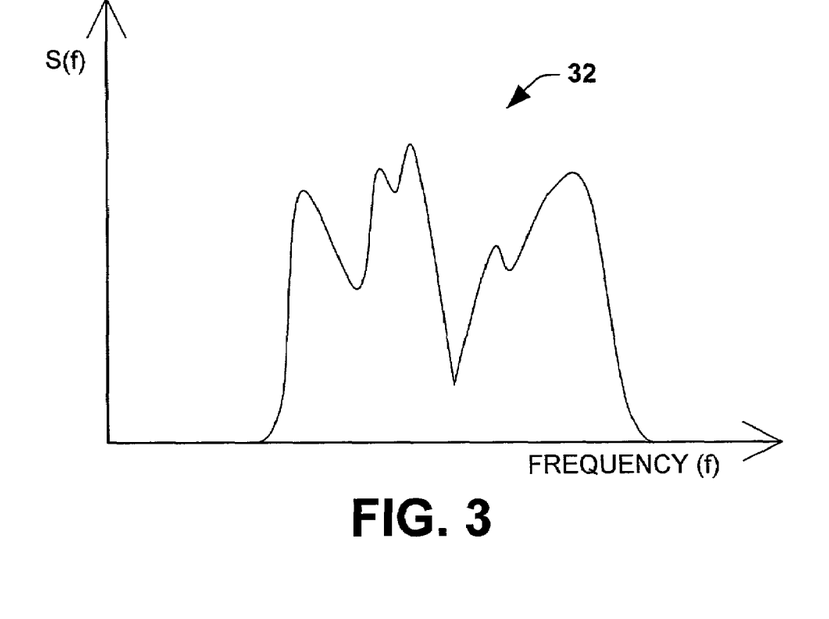
FIG. 3 illustrates a graph of power density spectrum S(f) versus frequency (f) of a received signal corresponding to the transmission signal of FIG. 2 being transmitted over the channel.

However, in some cases the demodulation of the tones requires information relating to the wireless channel magnitude and phase at each tone. The effects of the dispersion caused by the channel need to be compensated prior to decoding of the signal, so that decoding errors can be minimized. For example, FIG. 2 illustrates a graph of the power spectrum S(f) versus frequency (f) of a transmission signal 30 being transmitted from a transmitter. FIG. 3 illustrates a graph of the power spectrum S(f) versus frequency (f) of a received signal 32 corresponding to the transmission signal 30 after being transmitted over a wireless channel. The transmitted signal 30 is shown as a signal with a flat band-pass spectrum, but the received signal 32 is shown as a spectrum with many peaks and dips caused by multipath effects.

Referring back to FIG. 1, a channel estimator component 20 is provided to determine the amount of phase rotation and magnitude perturbation applied to the tones by the channel. Since the training tones are transmitted with known magnitude and phase, the channel response at the training tones is easily determined. The known channel response at the training tones is then interpolated in the frequency domain to determine the channel response at the data tones. A cyclic interpolation procedure can be employed. The channel estimate (Ĥ) is then provided to the data demodulator 22 for demodulation of the digital data signal. The demodulated data signal is then transmitted to a data postprocessing component 24 for further signal processing. The data postprocessing component 24 performs error correction utilizing the information provided by the data demodulator 24 in addition to providing block or packet formatting. The data postprocessing component 24 then outputs the data.

The channel estimator 20 extracts the training tones from the number of tones (N) in the data signal or data burst and performs several signal processing steps on the training tones. After correcting for any transmitted magnitude and phase differences, the channel estimator 20 performs an IFFT on the training tones to provide a channel impulse response. The channel impulse response will eventually be zero padded and have a FFT performed on it to obtain channel estimate values at frequencies between the training tone frequencies. Prior to this, the channel impulse response is frequency shifted for each data burst so that channel estimate values can be obtained at different frequencies on successive data bursts. The frequency shifting is based on a burst count value that increments modulo K. The channel estimator 20 divides the burst frequencies into K subsets, such that the FFT performed on the frequency shifted channel impulse response is an N/K point FFT. Each time a new burst is received over the channel, the channel impulse response is determined and frequency shifted based on the burst count value. It is then zero padded to create N/K total samples. An N/K point FFT is performed on the frequency shifted channel impulse response to provide channel estimate values for the frequency subset.

The K sets are combined or aggregated to determine a full channel estimate (e.g., values for all frequencies). Once a full channel estimate has been obtained, N/K point FFTs are performed each time a burst occurs to provide an updated channel estimate for one of the K frequency subsets. Each time an N/K point FFT is performed, the burst channel estimate is combined or aggregated with the previous channel estimates such that N/K points of the channel estimate are updated each burst. The full channel estimate is completely updated every K data bursts. The channel estimator 20 processes the training tones to determine the channel estimate by employing reduced or partial FFT computations. The reduced or partial FFT computations increase the throughput of the receiving system 10 by reducing the number of instructions required to process the incoming digitized signal.

The channel estimator 20 facilitates a reduction in the operation counts required to determine the channel estimate. The operation counts for a radix-2 FFT can be estimated by evaluating the expression $N*\log_2(N)$ for the number of complex multiplies in the FFT. A 512-point FFT requires about 4,596 operations. The operational count estimate (assuming K=4) for $N/K* \log_2(N/K)$ is 896 operations. Thus, a substantial reduction in the number of operational counts results by updating portions of the channel estimate at each burst as opposed to updating the entire channel estimate for each burst. Although the present example is illustrated with respect to K=4, K could be any number, but powers of 2 (e.g., 2, 8, 16, 32, 64) are particularly advantageous. Furthermore, N could be 128, 256, 512, 1024 or any other number based on system requirements.

Channel estimation in accordance with an aspect of the invention can be employed on a variety of different communication methods and devices utilizing FFT analysis in a channel estimation procedure. One particular communication method is referred to as multicarrier modulation. One special case of multicarrier modulation is referred to as Orthogonal Frequency Division Multiplexing (OFDM). In general, OFDM is a block-oriented modulation scheme that maps a number of data symbols into a number of orthogonal carriers separated in frequency 1/T where T is a block period. OFDM is a technique by which data is transmitted at a high rate by modulating several low bit rate carriers in parallel rather than one single high bit rate carrier. OFDM is particularly useful in the context of Digital Video Broadcasting (DVB), High Definition Television (HDTV) and also for Asymmetric Digital Subscriber Lines (ADSL). OFDM can also be useful in satellite television systems, cable television, video on demand, interactive services, mobile communication devices, voice services and Internet services.

In transmission of a data signal, an OFDM modulator converts a serial data stream into a block of N complex carriers. These carriers, of which phase and amplitude can be modulated, correspond to a time domain waveform that is generated using an Inverse Fast Fourier Transform (IFFT). The data signal is then amplified and transmitted over a wireless channel to a receiver. At the receiver end, a data signal or data burst is received in the time domain and converted back into the frequency domain employing a FFT for extraction of the frequencies (e.g., tones) from the data burst. The frequency domain signal is comprised of a plurality of data tones, training tones and zero tones. The training tones are transmitted at known magnitude and phase and employed in determining the channel estimate for use in compensating the data tones due to the effects of the channel on the tones.

The following examples will be illustrated with respect to a wireless receiver system and method for receiving and correcting errors in a transmission signal adhering to OFDM. However, it is to be appreciated that the present invention is applicable to other types of transmission signals where FFTs are performed to compute the channel estimate utilizing training signals or tones. Additionally, some of the examples are illustrated with respect to a channel estimation approach employing 512 total tones with 32 training tones. However, a variety of different tone configurations (e.g., 1024 total tones, 64 training tones) can be employed and still fall within the scope of the present invention and the appended claims.

Figure 4:
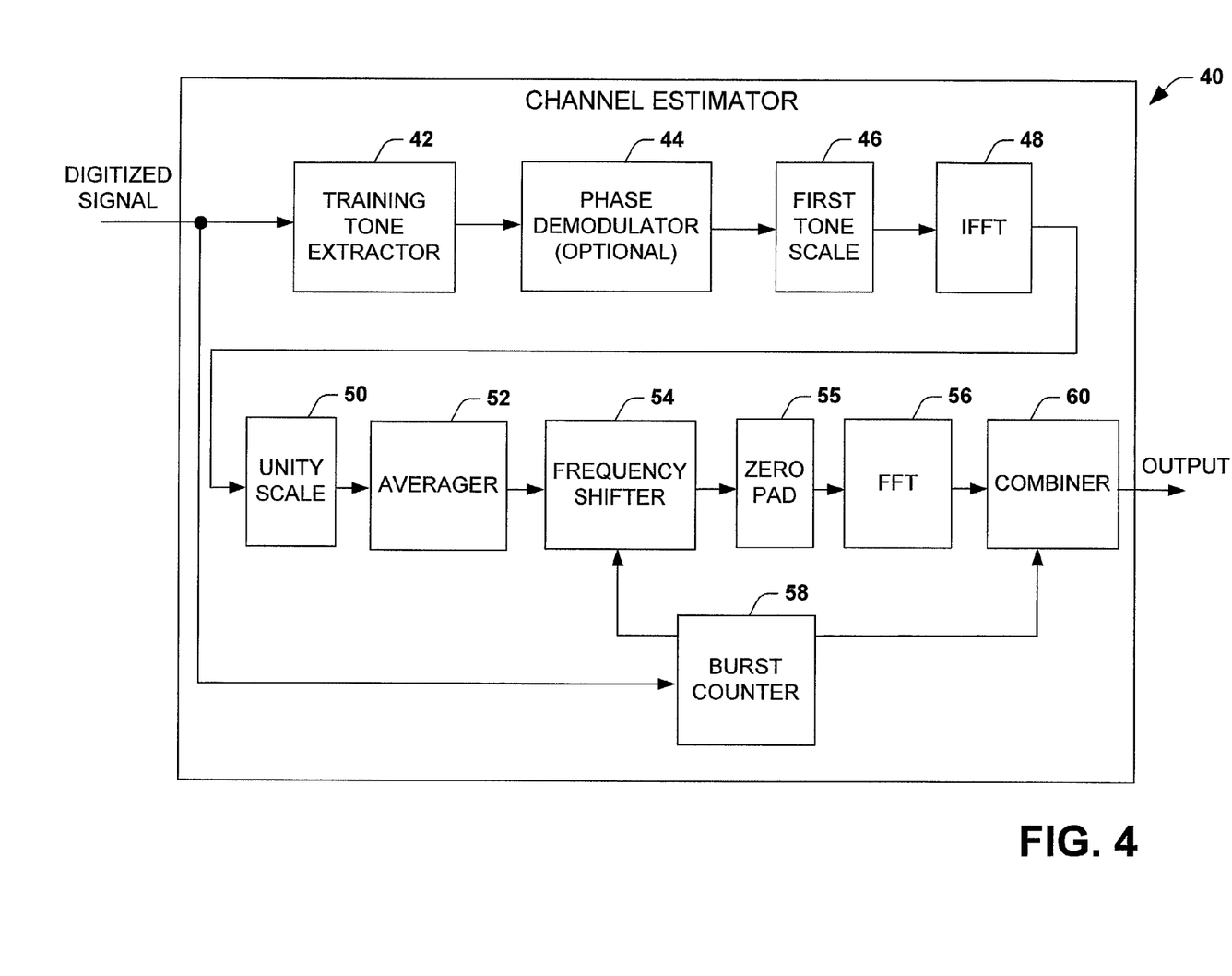
FIG. 4 illustrates a functional block diagram of a channel estimator in accordance with one aspect of the present invention.

FIG. 4 illustrates a functional block diagram of a channel estimator 40 in accordance with one aspect of the present invention. The channel estimator 40 receives a digitized signal or burst (e.g., conforming to OFDM), after the burst has been amplified, filtered, digitized, decimated and converted into the frequency domain by applying a FFT algorithm. The resultant digitized format consists of a plurality of zero tones and a plurality of training tones dispersed amongst a plurality of data tones. The channel estimator 40 includes a training tone extractor 42, which extracts the training tones from the data burst. A burst counter 58 monitors each data burst as it is received by the channel estimator 40 and increments upon receipt of each burst. An optional phase demodulator 44 is provided. The extracted training tones are sometimes modulated with QPSK data. If this is the case, the phase demodulator 44 removes the phase modulation from the extracted training tones.

The first tone of the training tones (i.e., the edge tone) can be scaled by a reduction factor and transmitted with reduced magnitude. The first tone scale 46 scales the first tone by the inverse of the reduction factor to restore its magnitude to that of the other training tones. An IFFT 48 is then performed on the training tones to obtain time samples of a channel impulse response. The training tones are initially transmitted with magnitudes larger than the data tones for signal to noise reasons. The impulse response is then globally rescaled by a unity scale 50 to effectively adjust the training tones to unit magnitude. The now rescaled channel impulse response is averaged with previous channel impulse responses by an averager 52 which can be, for example, a single-pole filter. It is to be appreciated that the average impulse response can be an average of a current impulse response and previous impulse responses or a sample average of the current impulse response itself. In certain circumstances, it may be beneficial to turn off averager 52. The average channel impulse response is provided to a frequency shifter 54. The frequency shifter shifts the impulse response spectrum by b/K frequency bins of an N/K point FFT, where N is the number of tones in a data signal, K is the FFT reduction factor, and b is the burst count value of the burst counter 58. The frequency shifted impulse response is then provided to a FFT component 56.

The tone frequencies are divided into K subsets, such that channel estimate values are determined each data burst for the tone frequencies in one subset. The burst counter 58 is coupled to the frequency shifter 54 and a combiner 60 and determines which one of the K frequency subsets the channel estimates are to be determined and/or updated. The frequency shifted channel impulse response is provided to the FFT 56 for updating $1/K^{th}$ the number of tones N of the channel estimate. The frequency shifted impulse response is provided to a zero padding component 55. The zero padding component 55 adds zeroes to the frequency shifted impulse response to provide N/K time samples to the FFT component 56.

The FFT component 56 performs an N/K point FFT on the N/K time samples to provide a channel estimate for one of the K frequency subsets based on the count value of the burst counter 58. The partial channel estimate is then combined with one or more partial channel estimates in a combiner 60 to provide a full channel estimate. The full channel estimate is then transferred to the next stage of the receiver for further processing. Each time a new data burst is received, the burst counter 58 is incremented, the channel impulse response is frequency shifted and a different portion (one of the K subsets) of the channel estimate is determined. A subset or portion of the channel estimate is updated each data burst. A full channel estimate update occurs every K bursts.

Figure 5:
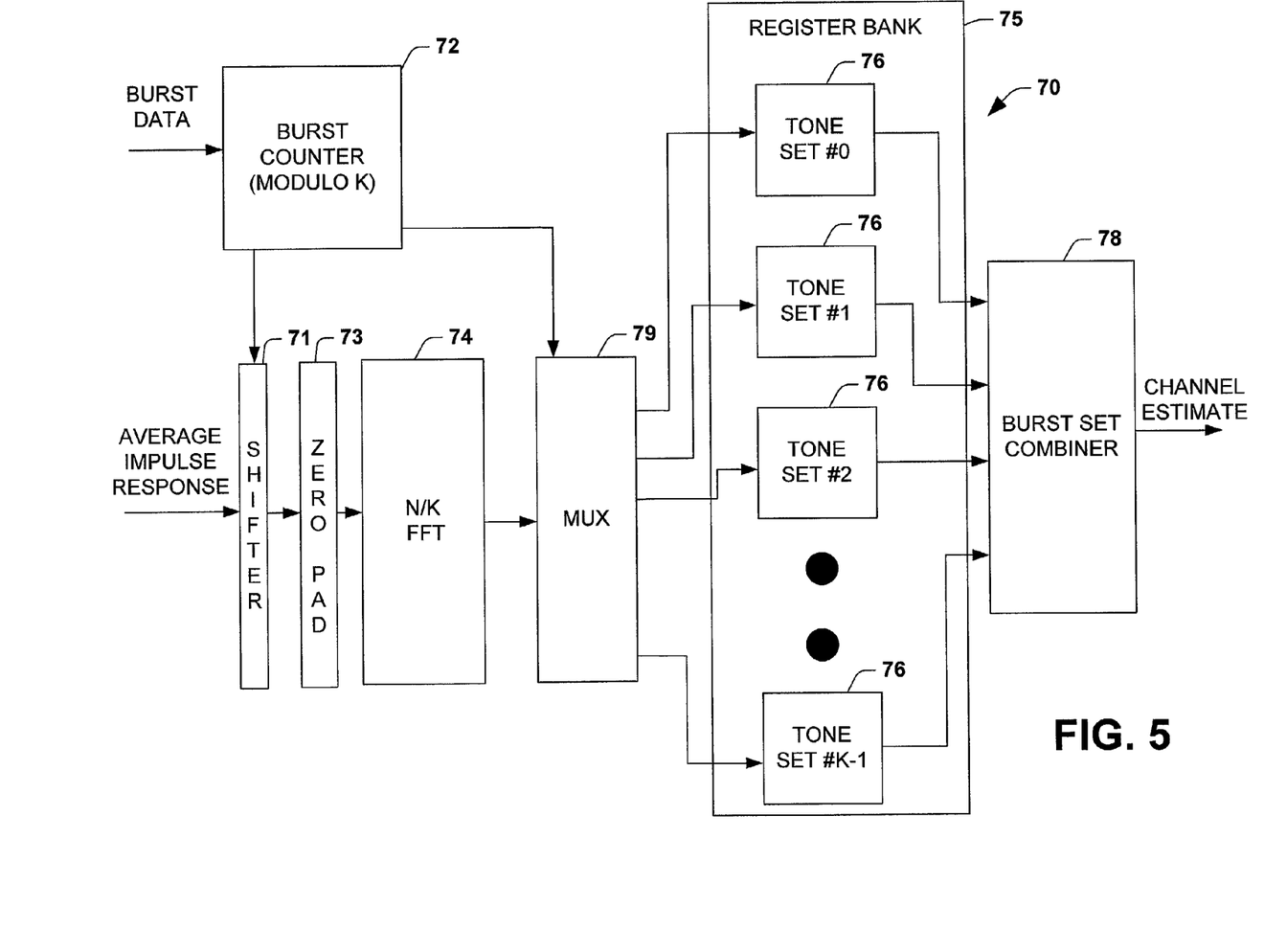
FIG. 5 illustrates a functional block diagram of a system for determining an aggregated channel estimation in accordance with one aspect of the present invention.

FIG. 5 illustrates an alternate system for determining an aggregated or full channel estimate from a plurality of partial channel estimates in accordance with an aspect of the present invention. An average channel impulse response is received by a frequency shifter 71, which shifts the impulse response spectrum based on the state of a burst counter 72. It is to be appreciated that the average impulse response can be an average of a current channel impulse response and previous channel impulse responses or a one sample average composed of the current impulse response itself. A zero pad component 73 adds zeroes to the average impulse response to provide N/K time samples to an N/K point FFT 74 where N is the total number of tones in a data signal or data burst and K is the reduction factor or number of partial channel estimates that are combined to provide a full channel estimate. The N/K point FFT component 74 then performs an N/K point FFT on the frequency shifted impulse response.

The total number of tones in a data signal corresponds to the total number of tones (N) in a channel estimate. The impulse response is employed to interpolate the channel response at the training tone frequencies to the data tone frequencies, so that channel estimates are provided for each tone. The channel estimate is divided into K frequency sets, each containing $1/K^{th}$ of the total number of tones N in a full channel estimate. For example, if the total number of tones N in a data burst is 512 tones and the reduction factor or the number of subsets of the channel estimate is 4 (i.e., K=4), the N/K point FFT 74 would be a 128-point FFT. The 128-point FFT would be performed on the impulse response with a different frequency shift each time a burst is received based on the value of the burst counter 72, which is incremented modulo K.

By way of example, for K=4 and N=512, the tone indices in each set will be as follows: $S_0=\{0, 4, 8, \ldots, 508\}$; $S_1=\{1, 5, 9, \ldots, 509\}$; $S_2=\{2, 6, 10, \ldots, 510\}$; $S_3=\{3, 7, 11, \ldots, 511\}$. The channel estimates for one set of tones are updated in one burst. For the K=4 example, assuming 32 training signals, a 32 sample channel impulse response is padded with 96 zeros and a 128-point FFT is performed to obtain a channel estimate for ¼ of the tones. On each successive burst, a different set of tones is updated so that after 4 bursts all the tones have been updated. The net result is a gain in computational economy with little or no loss in estimation accuracy.

A burst counter 72 is incremented modulo K, where K is the reduction factor for the FFT and also corresponds to the number of partial channel estimates or channel estimate subsets forming a full or aggregated channel estimate. For example, if the burst size (N) is 512, and the FFT is reduced to a 128-point FFT, then K is 4. In that case, the burst counter 72 would have values from 0 to 3 and then repeat after reaching 3. After a reduced FFT is performed on the appropriately shifted average channel impulse response, a new partial channel estimate is provided to a multiplexer (MUX) 79. The MUX 79 determines which tone set 76 of K different tone sets 76 of a register bank 75 to update with the new partial channel estimate based on the burst counter value. The register bank 75 contains a number of tone sets 76 labeled from set #0 to set #K−1. Each tone set holds the channel estimate values for the tone frequencies in the set.

Each time a burst is received, a selected one of the tone sets 76 is updated with new channel estimate values. The register bank 75 can be implemented in custom hardware, for example, when employing an application specific integrated circuit (ASIC) for channel estimate computations, or can be implemented in a processor and/or software, for example, when utilizing a digital signal processor (DSP) for channel estimate computations. A burst set combiner 78 utilizes the tone sets 76 to provide a full channel estimate (i.e., for all tones) to subsequent processing stages each time a new burst is received. The full channel estimate is completely updated after K data bursts.

Figure 6:
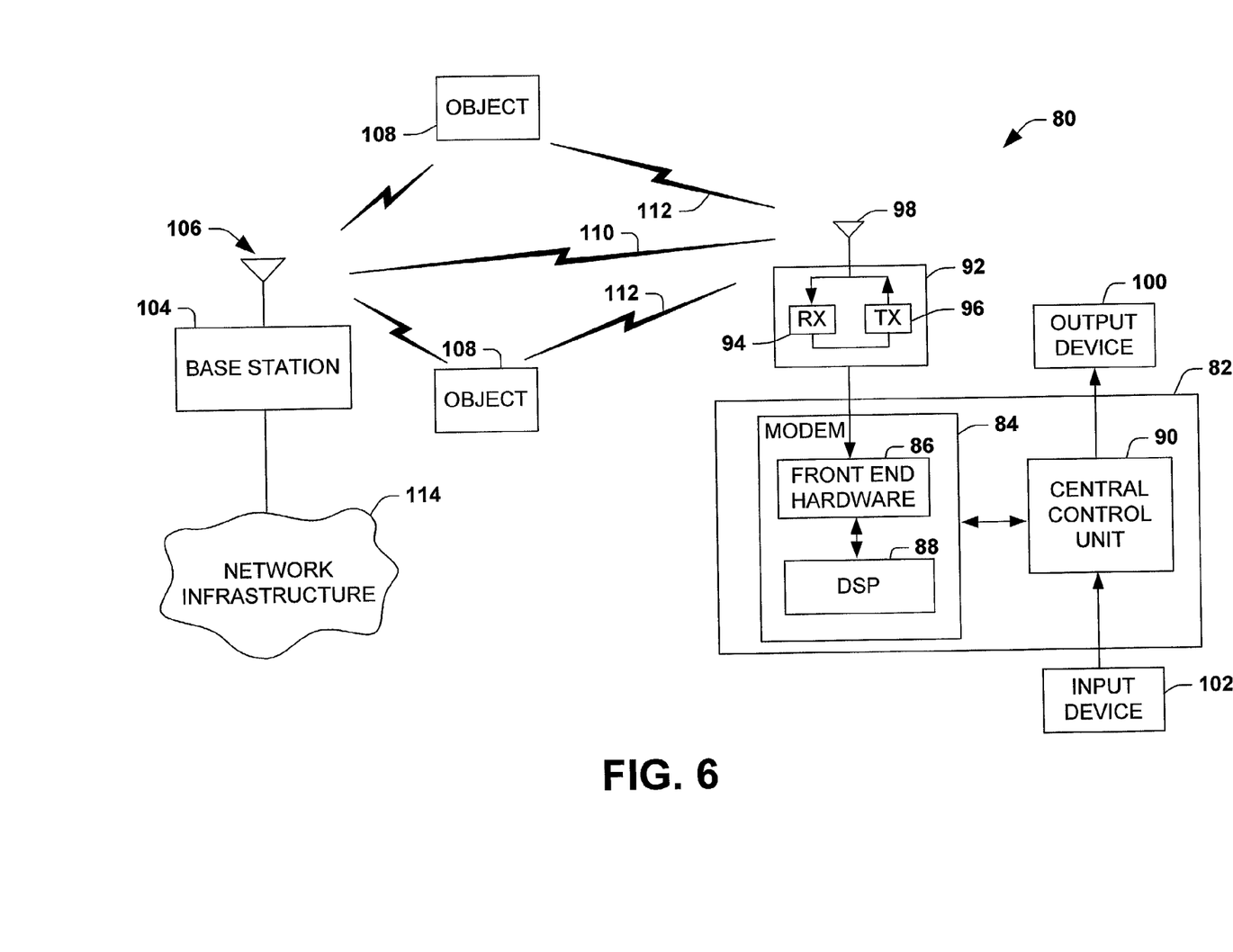
FIG. 6 illustrates a functional block diagram of a wireless communication system in accordance with one aspect of the present invention.

FIG. 6 illustrates one example of a possible application of the present invention as it applies to a wireless communication system. A base station 104 includes a transmitter 106 for transmitting data signals wirelessly through an environment. The base station 104 is coupled to a network infrastructure 114 via a server (not shown) or the like. The network infrastructure 114, for example, can include the Internet, an intranet or other type of network infrastructure. The base station 114 or its associated server (not shown) are programmed and/or configured to facilitate communication of network information relative to the network infrastructure 114 using a defined network protocol (e.g., TCP/IP, Fibre channel, etc.). The network information, for example, can include interactive video and/or audio data as well as other types of data.

For each data burst from transmitter 106, a main data burst signal 110 is transmitted, which is received by an antenna 98 coupled to a transceiver 92. The main data burst signal 110 reflects off one or more objects 108 in the environment causing the antenna 98 to receive a plurality of reflected signals 112 of the main data burst signal 110. The transceiver 92 includes a receiving device 94, which transfers both the main signal and the reflected signals to a modem 84. The transceiver 92 also includes a transmitter 96 for transmitting request and other data to the base station 104.

A channel estimation procedure in accordance with an aspect of the present invention is incorporated into a DSP 88 residing on the modem 84. The modem 84 includes front end hardware for amplifying, filtering and digitizing a digital signal or burst received over the antenna 98 coupled to the receiving device 94. The modem 84 is incorporated into a set top box 82. Alternatively, the modem 84 could be a set top box directly connected to the antenna 98. The set top box 82 resides in a fixed location such as a house or building. The channel estimation procedure of the present invention is especially useful in applications where the receiver is located in a fixed position. In these applications, the channel changes at a rate of about 1-2 hertz or about every second.

In OFDM, bursts can be transmitted about every 100 µseconds or 10,000 burst per second. Theoretically, the channel estimate does not need to be completely updated but every 1,000 to 10,000 bursts for these applications. However, other issues, such as the possibility of burst interference, that might corrupt the channel estimate and influence the decoding of many bursts, force channel updates more frequently. Since K is the number of bursts needed to completely update the channel estimate, K can be chosen to be a power of 2. For some systems or applications, K could be chosen to be any power of 2 (e.g., 2, 4, 8, 16, 32, 64, 128). Powers of 2 are advantageous because of the computational economies of the FFT when dealing with block sizes that are powers of 2.

The modem 84 is coupled to a central control unit 90 which handles additional processing steps and provides a mechanism for user interaction. The central control unit 90, for example, can be a personal computer, a controller coupled to a television or some other appliance in the building. The central control unit 90 is coupled to an input device 102 for receiving instructions from a user directly or indirectly by a remote link. An output device 100 is also provided, so that selection information and requests can be displayed to the user. The central control unit 90 can include programming for providing task selections, requests and control to a user and allowing a user to interact with information available over the Internet 114. It is to be appreciated that the applicability of the present invention is not limited to the Internet and many other communication implementations of the present invention can be employed. Additionally, the modem 84 could be physically integrated into the central control unit 90, such as an internal modem or removable card.

Figure 7:
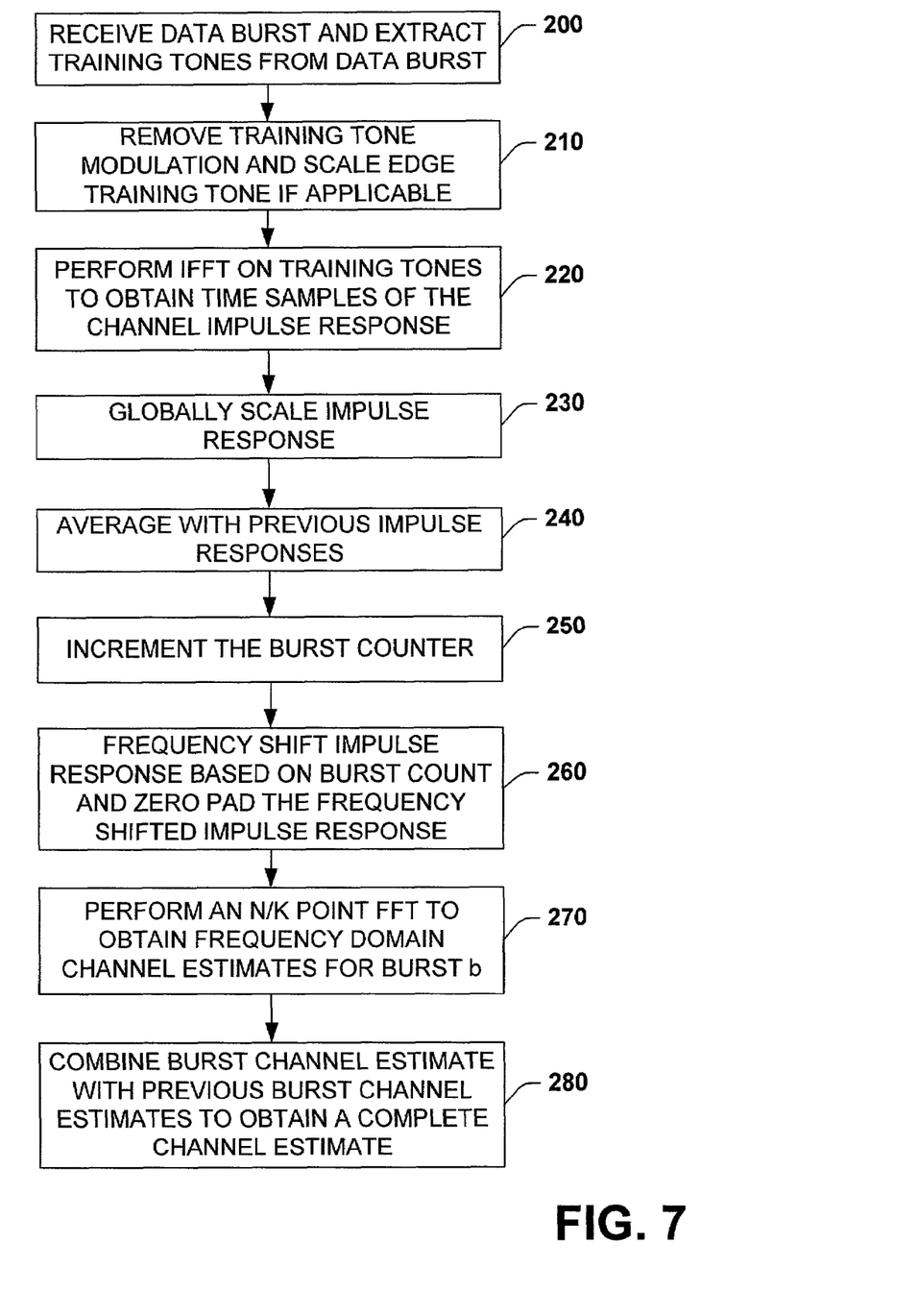
FIG. 7 illustrates a flow diagram of a methodology for performing a channel estimation procedure in accordance with one aspect of the present invention.
Figure 8:
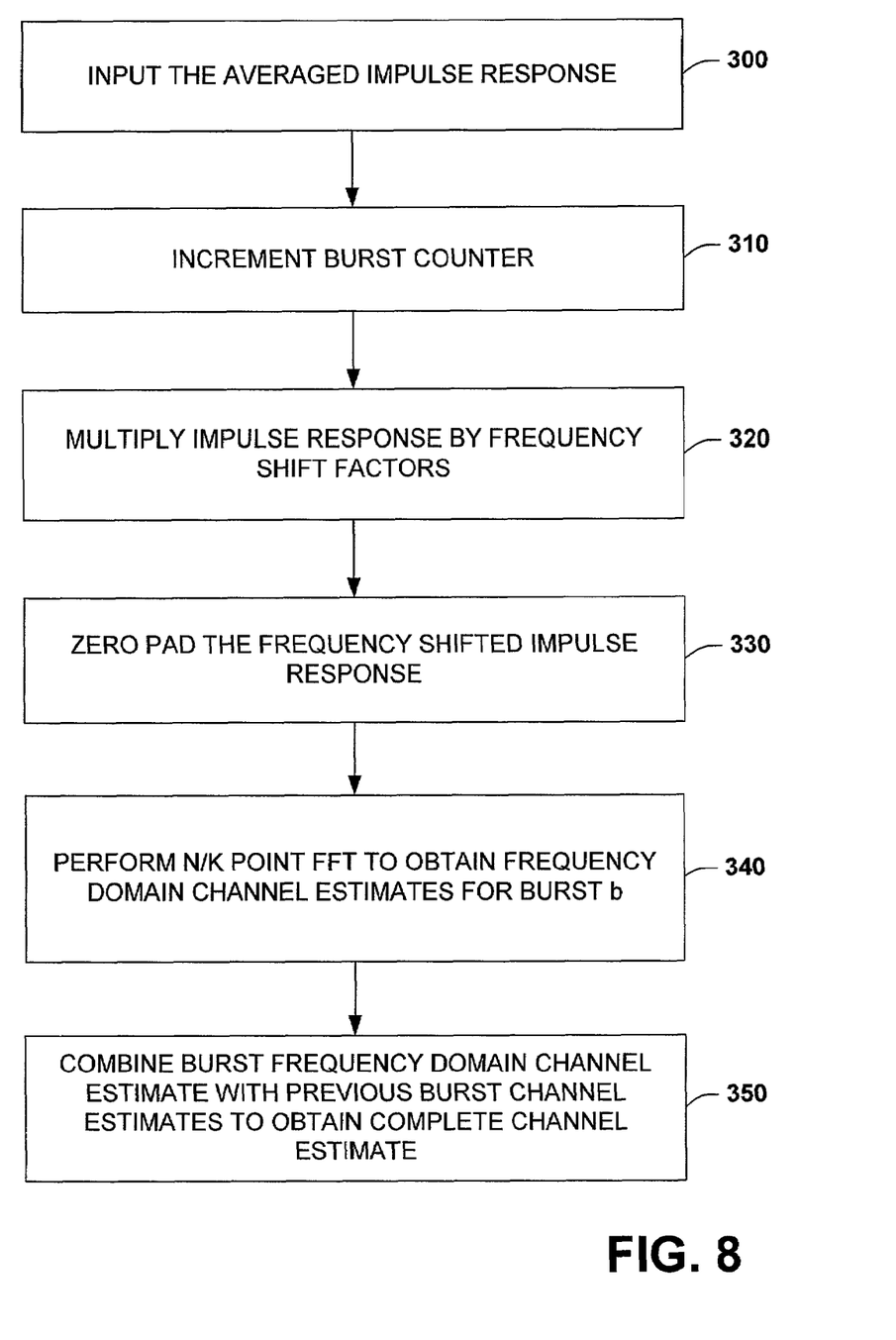
FIG. 8 illustrates a flow diagram of a methodology for evaluating a channel estimate in accordance with one aspect of the present invention.

In view of the foregoing structural and functional features described above, a methodology in accordance with various aspects of the present invention will be better appreciated with reference to FIGS. 7-8. While, for purposes of simplicity of explanation, the methodologies of FIGS. 7-8 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 7 illustrates one particular methodology for performing a channel estimation procedure in accordance with one particular aspect of the present invention. The methodology begins at 200 where a receiver receives a data burst in the frequency domain (e.g., tones) and extracts the training tones from the data burst. The input to the channel estimation procedure is the complete set of frequency samples (tones) obtained from an initial FFT performed by the receiver. The training tones are extracted from the full set of tones. The training tones have been transmitted with magnitude and phase known a priori, and are used for the channel estimation. The training tones are sometimes phase modulated with QPSK data. The first tone of the training tones (i.e., the edge tone) is sometimes transmitted with reduced amplitude using a reduction factor. At 210, the phase modulation is removed and the edge training tone is scaled. The edge tone is scaled by the inverse of the reduction factor to restore its magnitude to that of the other training tones.

At 220, an IFFT is performed on the training tones to obtain time samples of the channel impulse response. The methodology then proceeds to 230. The training tones were initially transmitted with magnitudes larger than the data tones for signal to noise reasons. At 230, the channel impulse response is now globally rescaled (all samples are rescaled by the same factor) to adjust the training tone magnitude to unity. The now rescaled channel response is averaged with the previous channel responses in a simple single-pole filter at 240. In one aspect of the invention, the filter is defined by: $h_{avg}(n) \leftarrow \beta h_{avg}(n) + (1-\beta)h(n)$, where the index n defines the sample number, h(n) the channel impulse response at sample n and $h_{avg}(n)$ the average channel impulse response at sample n. The average channel impulse response can be an average of a current impulse response and previous impulse responses or a one sample average composed of the current channel impulse response itself (e.g., $\beta=0$). The burst counter is then incremented at 250. The burst counter could be implemented in software if a DSP is being employed or in hardware if an ASIC is being employed. The method then proceeds to 260.

At 260, the method frequency shifts the channel impulse response based on the state of the burst counter to obtain a frequency shifted channel impulse response and zero pads the frequency shifted channel impulse response to provide N/K time samples to an N/K point FFT. At 270, an N/K point FFT is performed on the frequency shifted channel impulse response to obtain a partial channel estimate for burst b. The FFT transforms the time domain channel impulse response into the frequency domain and generates a partial channel estimate (e.g., channel estimate values for a fraction of the total tone frequencies). The partial channel estimate is then combined with previously determined partial channel estimates to obtain an aggregated or complete channel estimate for the burst b at 280. The methodology of FIG. 7 is performed on each data burst received.

FIG. 8 illustrates one particular methodology of mathematically evaluating the channel estimate utilizing partial averaged channel impulse responses for each data burst in accordance with one aspect of the present invention. The methodology begins at 300 where the averaged channel impulse response is obtained, determined or received. The average channel impulse response can be represented by the following expression:

$$h_{avg}(n); n=0, \ldots, s-1 \qquad \text{EQ. 1}$$

where n is the sample number and s is the number of samples. At 310, a burst counter b is incremented modulo K, where K is the reduction factor for the FFT. K is also the number of partial channel estimates making a full channel estimate. For example, if the burst size (N) is 512, and we are reducing the FFT to a 128-point FFT, then K is 4. In that case, b would assume values from 0 to 3. The average channel impulse response is multiplied by frequency shift factors at 320. This multiplication shifts the impulse response spectrum by b/K frequency bins at the input to the N/K point FFT. For example, if K=4, the frequency shift factors shift the spectrum of the impulse response 0/4, 1/4, 2/4, or 3/4 frequency bins, depending upon the burst count value. No frequency shift factor multiplication is required for b=0. Also, if there are only a few samples in the channel impulse response (e.g., 16, 32), the frequency shift multiplications are not very costly computationally. The multiplication of the impulse response by frequency shift factors can be represented by the following expression:

$$h'_{avg}(n) = h_{avg}(n) \cdot e^{-j2\pi n b/N}; n=0, \ldots, s-1 \qquad \text{EQ.2}$$

where n is the sample number and s is the number of samples.

At 330, the frequency shifted channel impulse response is zero padded to the size of the reduced FFT (N/K). For example, if there are 32 samples in the impulse response, then 96 zeros are added to increase the dimension to 128 (assuming N=512, and K=4). Zero padding of the of the frequency shifted impulse response can be represented by the following expression:

$$h_{pad}(n) = \begin{cases} h'_{avg}(n); & n = 0, \cdots, s-1 \\ 0; & n = s, \cdots, \frac{N}{K}-1 \end{cases} \qquad \text{EQ. 3}$$

where n is the sample number and s is the number of nonzero samples, N is the number of tones and K is the FFT reduction factor or partial channel estimate subsets. At 340, an N/K point FFT is performed to obtain the frequency domain channel estimates for burst b. This provides new estimates for N/K tones in the N-tone burst. The N/K point FFT can be represented by the following expression:

$$\hat{H}_b = FFT\{h_{pad}\} \qquad \text{EQ.4}$$

where $\hat{H}_b$ is the partial channel estimate obtained at burst b. At 350, the frequency domain estimates just obtained are combined with previous burst channel estimates for the remaining (K−1)N/K tones to provide a full channel estimate (e.g., an estimate for each tone in the burst). The combination of the frequency domain estimate just obtained combined with previous burst estimates can be represented by the following expression:

$$\hat{H}\{Kn+b\} = \hat{H}_b(n); \text{ for } n = 0, 1, \cdots, \frac{N}{K}-1 \text{ and } b = 0, \cdots, K-1 \qquad \text{EQ. 5}$$

where n is the sample number, N is the number of tones and K is the FFT reduction factor or number of partial channel estimate subsets. The methodology of FIG. 8 can be employed in a DSP as a software algorithm or in hardware such as in an ASIC. Although the methodology is especially useful in a communication system implementing OFDM, other communication system can employ the methodology to provide computational economy.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A receiver system comprising:
    a front end portion that receives and digitizes a data signal having one or more training tones and one or more data tones; and
    a channel estimator component that utilizes the digitized data signal to provide a partial channel estimate that is combined with at least one other partial channel estimate to provide an aggregated channel estimate, the channel estimator component further comprising a frequency shifter that shifts a spectrum of the average impulse response upon receipt of a data signal to provide N/K time samples to an N/K point Fast Fourier Transform component where N is the number of tones in a data signal and K is the number of partial channel estimates forming a full channel estimate, the N/K point Fast Fourier Transform component providing a partial channel estimate corresponding to the received data signal; and
    a burst counter that increments a count value on receipt of an incoming data signal, the count value determining which partial channel estimate is updated;
    wherein the channel estimator component is configured to extract training tones from the data signal and determine an average channel impulse response from the training tones, the average channel impulse response being utilized to determine the partial channel estimate.

2. The system of claim 1, the channel estimator component being adapted to update the aggregated channel estimate every K data signals, where K is the number of partial channel estimates forming a full channel estimate.

3. The system of claim 1, the count value being incremented modulo K, where K is the number of partial channel estimates forming a full channel estimate.

4. The system of claim 1, the frequency shifter shifting the spectrum of the average impulse response based on a count value that is incremented modulo K, such that a different partial channel estimate is determined based on the count value and a full channel estimate is updated every K data signals.

5. The system of claim 1, the frequency shifter shifting the spectrum of the average impulse response by multiplying the average impulse response by a frequency shift factor.

6. The system of claim 1, K being a power of 2.

7. The system of claim 1, the data signal being transmitted in a multicarrier modulation format.

8. The system of claim 1 being implemented as part of a modem.

9. The system of claim 1 being implemented as part of a wireless communication system coupled to the Internet.

10. A channel estimator comprising:
    a Fast Fourier Transform portion that receives a channel impulse response and performs a Fast Fourier Transform on the channel impulse response to provide a partial channel estimate; and
    a combiner that combines the partial channel estimate with at least one other partial channel estimate to provide an aggregated channel estimate; and
    a frequency shifter component that frequency shifts the spectrum of the channel impulse response upon receipt of a new data burst to provide a new set of N/K points to the Fast Fourier Transform portion where N is the total number of tones in a data signal and K is the number of partial channel estimates, such that a full channel estimate is updated every K data signals.

11. The channel estimator of claim 10, wherein the frequency shifter component frequency shifts the spectrum of the channel impulse response based on a burst count value that is incremented modulo L when a new data burst is received, where L is a reduction factor for the Fast Fourier Transform portion, such that the Fast Fourier Transform portion performs an N/L point Fast Fourier Transform on the channel impulse response.

12. The channel estimator of claim 10, wherein the channel impulse response being determined using training tones embedded in a data burst and a zero pad component that adds zeroes to the channel impulse response until the channel impulse response has N/K number of time samples.

13. The channel estimator of claim 12, the shifter component comprising a frequency shift factor multiplier.

14. The channel estimator of claim 12, K being a power of 2.

15. The channel estimator of claim 12, further comprising a register bank having K tone set registers for storing channel estimate values based on different partial channel estimates, one of the K tone set registers being updated for each data signal that is received.

16. The channel estimator of claim 15, further comprising a multiplexer coupled to a burst counter that increments repeatedly between 0 and K−1 upon receipt of data bursts, such that the multiplexer updates one of the K tone set registers based on the state of the burst counter.

17. The channel estimator of claim 10 forming part of an application specific integrated circuit.

18. The channel estimator of claim 10 being implemented as executable instructions programmed in a digital signal processor.

19. A wireless communication system comprising:
an Inverse Fast Fourier Transform component operative to receive training tones extracted from a digitized data signal and provide a channel impulse response;
a frequency shifting component that shifts the spectrum of the channel impulse response based on a burst count value;
a Fast Fourier Transform portion that receives the frequency shifted channel impulse response and performs a Fast Fourier Transform on the frequency shifted channel impulse response to provide a partial channel estimate; and
a combiner that combines the partial channel estimate with at least one other partial channel estimate to provide an aggregated channel estimate, wherein the data signal being transmitted in a multicarrier modulation format.

20. A method for performing a channel estimation procedure comprising:
extracting training tones from a digitized data burst;
determining a channel impulse response based on the extracted training tones;
frequency shifting the spectrum of the channel impulse response;
performing a Fast Fourier Transform on the frequency shifted channel impulse response to provide a partial channel estimate; and
dividing the total number of tones N in a data burst into K sets such that $1/K^{th}$ of the channel estimates of a full channel estimate are updated for each data burst received and the full channel estimate is updated every K bursts, where K is the number of partial channel estimates that form the full channel estimate.

21. The method of claim 20, further comprising combining the partial channel estimate with partial channel estimates corresponding to previously received digitized data bursts to provide an aggregated channel estimate.

22. The method of claim 20, the frequency shifting the spectrum of the channel impulse response comprising evaluating the expression:

$$h'_{avg}(n)=h_{avg}(n)e^{-j2\pi nb/N}; n=0, \ldots, s-1$$

where n is the sample number, s is the number of samples, b is a burst count value and N is the total number of tones in the digitized data burst.

23. The method of claim 20, the frequency shifting the spectrum of the impulse response comprising multiplying the channel impulse response by a frequency shift factor.

24. The method of claim 23, further comprising incrementing a burst counter having a burst counter value, the burst counter value changing the frequency shift factor multipliers for each data burst received, so that different partial channel estimate can be determined for each data burst.

25. The method of claim 24, the burst counter having a burst value being incremented modulo K for each data burst received, where K is the number of partial channel estimates that form a full channel estimate.

26. The method of claim 20, further comprising zero padding the frequency shifted channel impulse response to provide N/K number of time samples where N is the total number of tones in a data burst and K is the number of partial channel estimates that form a full channel estimate.

27. The method of claim 20, the performing a Fast Fourier Transform on the frequency shifted channel impulse response comprising performing a N/K point Fast Fourier Transform where N is the total number of tones in a data burst and K is the number of partial channel estimates that form a full channel estimate.

28. A digital signal processor employing computer executable instructions for performing a method comprising:
extracting training tones from a data burst;
determining a channel impulse response based on the extracted training tones;
frequency shifting the spectrum of the channel impulse response;
performing a Fast Fourier Transform on the frequency shifted channel impulse response to provide a partial channel estimate;
combining the partial channel estimate with at least one other partial estimate to form an aggregated channel estimate; and
dividing the total number of tones N in a data burst into K training sets such that 1/K of the channel estimates of a full channel estimate are updated for each data burst received and the full channel estimate is updated every K bursts, where K is the number of partial channel estimates that form the full channel estimate.

29. The digital signal processor of claim 28, further comprising combining the partial channel estimate with partial channel estimates corresponding to previously received data bursts to provide a full channel estimate.

30. The digital signal processor of claim 28, the performing a Fast Fourier Transform on the frequency shifted channel impulse response comprising performing an N/K point Fast Fourier Transform.

31. A system for determining the effects of a transmission environment on a transmission signal, the system comprising:

means for extracting training tones from a received data signal;

means for determining a channel impulse response based on the extracted training tones;

means for frequency shifting the spectrum of the channel impulse response;

means for performing a Fast Fourier Transform on the frequency shifted channel impulse response to provide a partial channel estimate;

means for combining the partial channel estimate with other partial channel estimates determined for different data signals to provided an aggregated channel estimate; and means for dividing the total number of tones N in a data burst into K training sets such that 1/1 Kth of the channel estimates of a full channel estimate are updated for each data burst received and the full channel estimate is updated every K bursts, where K is the number of partial channel estimates that form the full channel estimate.

* * * * *